(12) United States Patent
Guo et al.

(10) Patent No.: US 12,278,675 B2
(45) Date of Patent: Apr. 15, 2025

(54) MICROWAVE TRANSMISSION METHOD AND RELATED DEVICE

(71) Applicant: HUAWEI TECHNOLOGIES CO., LTD., Shenzhen (CN)

(72) Inventors: Jia Guo, Chengdu (CN); Bing Jiang, Chengdu (CN); Li Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/827,025

(22) Filed: May 27, 2022

(65) Prior Publication Data

US 2022/0294501 A1    Sep. 15, 2022

Related U.S. Application Data

(63) Continuation of application No. PCT/CN2020/122787, filed on Oct. 22, 2020.

(30) Foreign Application Priority Data

Nov. 29, 2019 (CN) .......................... 201911204602.8

(51) Int. Cl.
*H04B 7/0426* (2017.01)
*H04B 7/0456* (2017.01)
*H04W 52/24* (2009.01)

(52) U.S. Cl.
CPC ......... *H04B 7/0434* (2013.01); *H04B 7/0465* (2013.01); *H04W 52/24* (2013.01)

(58) Field of Classification Search
CPC .... H04B 7/0434; H04B 7/0465; H04W 52/24

USPC ......................................................... 375/262
See application file for complete search history.

(56) References Cited

U.S. PATENT DOCUMENTS

| | | | |
|---|---|---|---|
| 2003/0035491 | A1 | 2/2003 | Walton et al. |
| 2009/0046573 | A1 | 2/2009 | Damnjanovic |
| 2013/0188579 | A1 | 7/2013 | Touboul et al. |
| 2015/0017929 | A1 | 1/2015 | Ljung et al. |

(Continued)

FOREIGN PATENT DOCUMENTS

| | | |
|---|---|---|
| CN | 102594427 A | 7/2012 |
| CN | 103609053 A | 2/2014 |

(Continued)

OTHER PUBLICATIONS

Extended European Search Report issued in corresponding European Application No. 20893528.8, dated Nov. 11, 2022, pp. 1-11.

(Continued)

*Primary Examiner* — Leila Malek
(74) *Attorney, Agent, or Firm* — HAUPTMAN HAM, LLP

(57) ABSTRACT

A method includes: The receive end receives 2N channels of signals through N first antennas, where the 2N channels of signals are respectively from N second antennas of the transmit end. When transmission performance of any one of the 2N channels of signals is less than a first threshold, the receive end respectively receives, from two second antennas, two channels of signals whose polarization directions are orthogonal. When transmission performance of the two channels of signals is both greater than a second threshold, the receive end receives the 2N channels of signals through the N first antennas.

20 Claims, 6 Drawing Sheets

(56) References Cited

U.S. PATENT DOCUMENTS

| | | | |
|---|---|---|---|
| 2016/0037530 A1* | 2/2016 | Peng | H04W 52/243 |
| | | | 370/329 |
| 2016/0149302 A1 | 5/2016 | Sanderovich et al. | |
| 2016/0157133 A1 | 6/2016 | Ehsan et al. | |
| 2017/0338882 A1* | 11/2017 | Sasame | H04B 7/10 |
| 2018/0102821 A1 | 4/2018 | Manolakos et al. | |

FOREIGN PATENT DOCUMENTS

| | | | |
|---|---|---|---|
| CN | 107370530 A | | 11/2017 |
| CN | 107453893 | * | 12/2017 |
| CN | 108270607 A | | 7/2018 |
| CN | 108781101 A | | 11/2018 |
| CN | 108833318 A | | 11/2018 |
| GB | 2575028 A | | 1/2020 |

OTHER PUBLICATIONS

International Search Report issued in corresponding International Application No. PCT/CN2020/122787, dated Jan. 20, 2021, pp. 1-9.
Chinese Office Action issued in corresponding Chinese Application No. 201911204602.8, dated Dec. 3, 2021, pp. 1-7.

* cited by examiner

MICROWAVE TRANSMISSION METHOD AND RELATED DEVICE

CROSS-REFERENCE TO RELATED APPLICATIONS

This application is a continuation of International Patent Application No. PCT/CN2020/122787, filed on Oct. 22, 2020, which claims priority to Chinese Patent Application No. 201911204602.8, filed on Nov. 29, 2019. The disclosures of the aforementioned applications are hereby incorporated by reference in their entireties.

TECHNICAL FIELD

Embodiments of this application relate to the field of microwave communication, and in particular, to a microwave transmission method and a related device.

BACKGROUND

A multiple-input multiple-output (multiple-input multiple-output, MIMO) technology can use a plurality of transmit antennas and a plurality of receive antennas at a transmit end and a receive end respectively, so that signals are transmitted through the plurality of antennas of the transmit end and the plurality of antennas of the receive end respectively, and this improves data transmission efficiency. The MIMO technology can fully utilize space resources, and implement multiple-input multiple-output through a plurality of antennas. Therefore, a system channel capacity can be multiplied without increasing spectrum resources and antenna transmit power, to improve data transmission efficiency. However, the MIMO technology is susceptible to atmospheric impact. When rain fade or atmospheric inhomogeneity occurs, the system channel capacity may be reduced due to degradation of a data link for transmitting data by using the MIMO technology, and even data transmission may be interrupted.

Therefore, in the conventional technology, when the receive end receives a data signal from the transmit end, if the receive end finds that a data link between the transmit end and the receive end degrades, the receive end restarts an equalizer to trigger a decoupling process, so that the receive end is reconnected to the transmit end, and the data link between the transmit end and the receive end recovers.

However, in the foregoing solution, when the receive end restarts the equalizer, receiving a signal from the transmit end is interrupted. Therefore, service transmission between the transmit end and the receive end is interrupted. Therefore, when a data link in a MIMO transmission model degrades, how to improve the system channel capacity without interrupting data transmission needs to be studied.

SUMMARY

Embodiments of this application provide a microwave transmission method and a related device, to improve a system channel capacity without interrupting data transmission.

According to a first aspect, an embodiment of this application provides a microwave transmission method, where the method relates to a transmit end and a receive end, and the receive end performs the following steps: The receive end receives 2N channels of signals from the transmit end through N first antennas, where the 2N channels of signals are respectively from N second antennas of the transmit end, each first antenna of the N first antennas receives the 2N channels of signals, and each second antenna of the N second antennas sends two channels of signals. When transmission performance of any one of the 2N channels of signals is less than a first threshold, the receive end receives, from two different second antennas, two channels of signals whose polarization directions are orthogonal. When transmission performance of the two channels of signals is both greater than a second threshold, the receive end receives, from the transmit end, the 2N channels of signals through the N first antennas.

It should be understood that N is an integer greater than or equal to 2.

In this embodiment of this application, when the transmission performance of the any one of the 2N channels of signals is less than the first threshold, that is, when a data link between the transmit end and the receive end degrades to a specific extent, the receive end receives the two channels of signals that are in the 2N channels of signals and that are from the two second antennas and whose polarization directions are orthogonal. When the transmission performance of the two channels of signals is both greater than the second threshold, that is, when the data link between the transmit end and the receive end is recovered to a specific extent, the receive end resumes use of the at least 2N channels of signals. The two channels of signals not only carry data of another channel of signal, but also can reflect transmission performance of the another channel of signal. A combination of the two channels of signals is less affected by data link degradation than a combination of the 2N channels of signals. Therefore, even if the link degradation occurs, data transmission between the receive end and the transmit end is not interrupted. In addition, when the transmission performance of the two channels of signals is both greater than the second threshold, the receive end receives the 2N channels of signals through the N first antennas. This helps improve a system channel capacity, and improve data transmission efficiency.

According to the first aspect, in a first implementation of the first aspect of embodiments of this application, before the receive end receives the two channels of signals from two different second antennas of the second antennas, the method further includes: The receive end sends first indication information to the transmit end, where the first indication information is used to indicate the transmit end to use a first preset value as transmit power of (2N-2) channels of signals of the 2N channels of signals, and the (2N-2) channels of signals do not include the two channels of signals.

In this implementation, if the receive end needs to receive only the two channels of signals, the receive end needs to notify the transmit end to stop sending another channel of signal or reduce transmit power of the another channel of signal, to be specific, notify the transmit end to stop sending a signal other than the two channels of signals in the 2N channels of signals, or reduce transmit power of a signal other than the two channels of signals in the 2N channels of signals. Specifically, the receive end may send the first indication information to the transmit end, to indicate the transmit end to use the first preset value as the transmit power of the (2N-2) channels of signals in the 2N channels of signals. Because the receive end indicates a preset power value, and the transmit end gradually reduces power instead of immediately disabling the (2N-2) channels of signals, smooth transition of a system can be ensured, and a fault of a device such as an equalizer in the transmit end can be avoided. In addition, the transmit end only needs to reduce the transmit power to the first preset value, and does not need to disable the (2N−2) channels of signals. This facilitates subsequent link recovery.

According to the first aspect or the first implementation of the first aspect, in a second implementation of the first aspect of embodiments of this application, the transmission performance includes one or more of the following: an equivalent antenna distance and a multipath notch depth, where the equivalent antenna distance is a ratio of an actual antenna distance to a Rayleigh antenna distance, the actual antenna distance is a physical distance between the N first antennas of the receive end, and the multipath notch depth is used to indicate a multipath notch deterioration degree.

In this implementation, the transmission performance that needs to be detected by the receive end is specified, and this helps the receive end determine transmission performance of each of the 2N channels of signals based on a detection value of the transmission performance.

According to the second implementation of the first aspect, in a third implementation of the first aspect of embodiments of this application, the method further includes: when a modulation order of a modulation mode of the any one of the 2N channels of signals is lower than a modulation order of a preset modulation mode, the receive end determines the transmission performance of the signal.

In this implementation, an optional manner of triggering the receive end to detect the transmission performance of each channel of signal is provided. This helps the receive end preliminarily determine, based on a modulation mode of a signal, whether a data link degrades.

According to any one of the first aspect, or the first implementation of the first aspect to the third implementation of the first aspect, in a fourth implementation of the first aspect of embodiments of this application, before the receive end receives the 2N channels of signals through the N first antennas, and after the receive end receives the two channels of signals from the two different second antennas, the method further includes: The receive end sends second indication information to the transmit end, where the second indication information is used to indicate the transmit end to use a second preset value as transmit power of the (2N−2) channels of signals, and the second preset value is greater than the first preset value.

In this implementation, after the receive end determines that the transmission performance of the two channels of signals is greater than the second threshold, the receive end needs to notify the transmit end to use the second preset value as the transmit power of the (2N−2) channels of signals. Because the second preset value is greater than the first preset value, it may also be understood that the receive end needs to notify the transmit end to increase the transmit power of the (2N−2) channels of signals to the second preset value, to resume receiving of the 2N channels of signals to improve the system channel capacity. In addition, because the transmit end gradually increases the transmit power when recovering the (2N−2) channels of signals, the smooth transition of the system can be ensured, and the fault of the device such as the equalizer in the transmit end can be avoided.

According to the fourth implementation of the first aspect, in a fifth implementation of the first aspect of embodiments of this application, the method further includes: The receive end sends third indication information to the transmit end, where the third indication information is used to indicate the transmit end to send the signal by using a first modulation mode.

In this implementation, it is proposed that the receive end should send the third indication information to the transmit end to indicate the transmit end to send a signal by using a modulation mode, to avoid frequent switching in a transmission model adjustment process.

According to any one of the first aspect, or the first implementation of the first aspect to the fifth implementation of the first aspect, in a sixth implementation of the first aspect of embodiments of this application, the two channels of signals include a horizontal polarization signal and a vertical polarization signal.

According to a second aspect, an embodiment of this application provides a microwave transmission method, where the method relates to a transmit end and a receive end, and the transmit end performs the following steps: The transmit end sends 2N channels of signals to the receive end through N second antennas, where each second antenna of the N second antennas sends two channels of signals. When the transmit end receives first indication information from the receive end, the transmit end sends two channels of signals whose polarization directions are orthogonal to the receive end through two of the second antennas. When the transmit end receives second indication information from the receive end, the transmit end sends the 2N channels of signals to the receive end through the N second antennas.

It should be understood that N is an integer greater than or equal to 2.

In this embodiment of this application, the transmit end sends the 2N channels of signals to the receive end through the N second antennas, and the transmit end may adjust, based on indication information sent by the receive end, a quantity of signals sent to the receive end. When the transmit end receives the first indication information sent by the receive end, the transmit end may adjust to send two channels of signals whose polarization directions are orthogonal to the receive end. The two channels of signals not only carry data of another channel of signal, but also can reflect transmission performance of the another channel of signal. A combination of the two channels of signals is less affected by data link degradation than a combination of the 2N channels of signals. Therefore, service data transmission can be ensured when a data link degrades, and data transmission interruption can be avoided. When the transmit end receives the second indication information sent by the receive end, the transmit end may adjust to send the 2N channels of signals to the receive end. This helps improve a system channel capacity, and improve data transmission efficiency.

According to the second aspect, in a first implementation of the second aspect of embodiments of this application, the first indication information is used to indicate the transmit end to use a first preset value as transmit power of (2N−2) channels of signals in the 2N channels of signals, and the (2N−2) channels of signals do not include the two channels of signals.

In this implementation, the transmit end gradually reduces power instead of immediately disabling the (2N−2) channels of signals, and this can ensure smooth transition of a system and avoid a fault of a device such as an equalizer in the transmit end. In addition, the transmit end only needs to reduce the transmit power to the first preset value, and does not need to completely disable the (2N−2) channels of signals. This facilitates subsequent link recovery.

According to the second aspect or the first implementation of the second aspect, in a second implementation of the second aspect of embodiments of this application, the second indication information is used to indicate the transmit end to use a second preset value as the transmit power of the (2N−2) channels of signals, and the second preset value is greater than the first preset value.

In this implementation, because the transmit end gradually increases the transmit power when recovering the (2N−2) channels of signals, the smooth transition of the system can be ensured, and the fault of the device such as the equalizer in the transmit end can be avoided.

According to any one of the second aspect, or the first implementation of the second aspect to the third implementation of the second aspect, in a fourth implementation of the second aspect of embodiments of this application, the method further includes: the transmit end receives third indication information from the receive end, where the third indication information is used to indicate the transmit end to send the signal by using a first modulation mode.

In this implementation, the transmit end sends the signal by using the modulation mode based on an indication of the third indication information, to avoid frequent switching in a transmission model adjustment process.

According to any one of the second aspect, or the first implementation of the second aspect to the fourth implementation of the second aspect, in a fifth implementation of the second aspect of embodiments of this application, the two channels of signals include a horizontal polarization signal and a vertical polarization signal.

According to a third aspect, an embodiment of this application provides a microwave communication device, and the microwave communication device includes: a receiving module, configured to receive 2N channels of signals through N first antennas, where the 2N channels of signals are respectively from N second antennas of a transmit end, each first antenna of the N first antennas receives the 2N channels of signals, and each second antenna of the N second antennas sends two channels of signals. The receiving module is further configured to: when transmission performance of any one of the 2N channels of signals is less than a first threshold, receive two channels of signals whose polarization directions are orthogonal from two different second antennas. The receiving module is further configured to: when transmission performance of the two channels of signals is greater than a second threshold, receive the 2N channels of signals through the N first antennas.

It should be understood that N is an integer greater than or equal to 2.

In this embodiment of this application, when the transmission performance of the any one of the 2N channels of signals is less than the first threshold, that is, when a data link between the transmit end and a receive end degrades to a specific extent, the receive end receives the two channels of signals that are in the 2N channels of signals and that are from the two second antennas and whose polarization directions are orthogonal. When the transmission performance of the two channels of signals is greater than the second threshold, that is, when the data link between the transmit end and the receive end is recovered to a specific extent, the receive end resumes use of the at least 2N channels of signals. The two channels of signals not only carry data of another channel of signal, but also can reflect transmission performance of the another channel of signal. A combination of the two channels of signals is less affected by data link degradation than the combination of the 2N channels of signals. Therefore, even if the data link degradation occurs, data transmission between the receive end and the transmit end is not interrupted. In addition, when the transmission performance of the two channels of signals is greater than the second threshold, the receive end receives the 2N channels of signals through the N first antennas. This helps improve a system channel capacity, and improve data transmission efficiency.

According to the third aspect, in a first implementation of the third aspect of embodiments of this application, the microwave communication device further includes: a sending module, configured to send first indication information to the transmit end, where the first indication information is used to indicate the transmit end to use a first preset value as transmit power of (2N−2) channels of signals of the 2N channels of signals, and the (2N−2) channels of signals do not include the two channels of signals.

In this implementation, if the microwave communication device needs to receive only the two channels of signals, the microwave communication device needs to notify the transmit end to stop sending another channel of signal or reduce transmit power of another channel of signal, to be specific, notify the transmit end to stop sending a signal other than the two channels of signals in the 2N channels of signals, or reduce transmit power of a signal other than the two channels of signals in the 2N channels of signals. Specifically, the microwave communication device may send the first indication information to the transmit end, to indicate the transmit end to use the first preset value as the transmit power of the (2N−2) channels of signals in the 2N channels of signals. Because the microwave communication device indicates the transmit end to gradually reduce power instead of immediately disabling the (2N−2) channels of signals, smooth transition of a system can be ensured, and a fault of a device such as an equalizer in the transmit end can be avoided. In addition, the transmit end only needs to reduce the transmit power to the first preset value, and does not need to completely disable the (2N−2) channels of signals. This facilitates subsequent link recovery.

According to the third aspect or the first implementation of the third aspect, in a second implementation of the third aspect of embodiments of this application, the transmission performance includes one or more of the following: an equivalent antenna distance and a multipath notch depth, where the equivalent antenna distance is a ratio of an actual antenna distance to a Rayleigh antenna distance, the actual antenna distance is a physical distance between the N first antennas of the receive end, and the multipath notch depth is used to indicate a multipath notch degradation degree.

In this implementation, the transmission performance that needs to be detected by the receive end is specified, and this helps the receive end determine transmission performance of each of the 2N channels of signals based on a detection value of the transmission performance.

According to the second implementation of the third aspect, in a third implementation of the third aspect of embodiments of this application, the microwave communication device further includes:

a processing module, configured to: when a modulation order of a modulation mode of the any one of the 2N channels of signals is lower than a modulation order of a preset modulation mode, determine the transmission performance of the signal.

In this implementation, an optional manner of triggering the receive end to detect transmission performance of each signal is provided. This helps the receive end preliminarily determine, based on a modulation mode of a signal, whether a data link degrades.

According to any one of the third aspect, or the first implementation of the third aspect to the third implementation of the third aspect, in a fourth implementation of the third aspect of embodiments of this application, the sending module is further configured to send second indication information to the transmit end, where the second indication information is used to indicate the transmit end to use a second preset value as the transmit power of the (2N−2) channels of signals, and the second preset value is greater than the first preset value.

In this implementation, after the receive end determines that the transmission performance of the two channels of signals is greater than the second threshold, the receive end needs to notify the transmit end to use the second preset value as the transmit power of the (2N−2) channels of signals. Because the second preset value is greater than the first preset value, it may also be understood that the receive end needs to notify the transmit end to increase the transmit power of the (2N−2) channels of signals to the second preset value, to resume receiving of the 2N channels of signals to improve the system channel capacity. In addition, because the transmit end gradually increases the transmit power when recovering the (2N−2) channels of signals, the smooth transition of the system can be ensured, and the fault of the device such as the equalizer in the transmit end can be avoided.

According to the fourth implementation of the third aspect, in a fifth implementation of the third aspect of embodiments of this application, the sending module is further configured to send third indication information to the transmit end, where the third indication information is used to indicate the transmit end to send the signal by using a first modulation mode.

In this implementation, it is proposed that the receive end should send the third indication information to the transmit end to indicate the transmit end to send a signal by using a modulation mode, to avoid frequent switching in a transmission model adjustment process.

According to any one of the third aspect, or the first implementation of the third aspect to the fifth implementation of the third aspect, in a sixth implementation of the third aspect of embodiments of this application, the two channels of signals include a horizontal polarization signal and a vertical polarization signal.

According to a fourth aspect, an embodiment of this application provides a microwave communication device, where the microwave communication device includes: a sending module, configured to send 2N channels of signals to a receive end through N second antennas, where each second antenna of the N second antennas sends two channels of signals. The sending module is further configured to: when a transmit end receives first indication information from the receive end, send the two channels of signals to the receive end through the two second antennas, where polarization directions of the two channels of signals are orthogonal. The sending module is further configured to: when the transmit end receives second indication information from the receive end, send the 2N channels of signals to the receive end through the N second antennas.

It should be understood that N is an integer greater than or equal to 2.

In this embodiment of this application, the transmit end sends the 2N channels of signals to the receive end through the N second antennas, and the transmit end may adjust, based on indication information sent by the receive end, a quantity of signals sent to the receive end. When the transmit end receives the first indication information sent by the receive end, the transmit end may adjust to send two channels of signals whose polarization directions are orthogonal to the receive end. The two channels of signals not only carry data of another channel of signal, but also can reflect transmission performance of the another channel of signal. A combination of the two channels of signals is less affected by data link degradation than a combination of the 2N channels of signals. Therefore, service data transmission can be ensured when a data link degrades, and data transmission interruption can be avoided. When the transmit end receives the second indication information sent by the receive end, the transmit end may adjust to send the 2N channels of signals to the receive end. This helps improve a system channel capacity, and improve data transmission efficiency.

According to the fourth aspect, in a first implementation of the fourth aspect of embodiments of this application, the first indication information is used to indicate the transmit end to use a first preset value as transmit power of (2N−2) channels of signals in the 2N channels of signals, and the (2N−2) channels of signals do not include the two channels of signals.

In this implementation, the transmit end gradually reduces power instead of immediately disabling the (2N−2) channels of signals, and this can ensure smooth transition of a system and avoid a fault of a device such as an equalizer in the transmit end. In addition, the transmit end only needs to reduce the transmit power to the first preset value, and does not need to completely disable the (2N−2) channels of signals. This facilitates subsequent link recovery.

According to the fourth aspect or the first implementation of the fourth aspect, in a second implementation of the fourth aspect of embodiments of this application, the second indication information is used to indicate the transmit end to use a second preset value as the transmit power of the (2N−2) channels of signals, and the second preset value is greater than the first preset value.

In this implementation, because the transmit end gradually increases the transmit power when recovering the (2N−2) channels of signals, the smooth transition of the system can be ensured, and the fault of the device such as the equalizer in the transmit end can be avoided.

According to any one of the fourth aspect, or the first implementation of the fourth aspect to the third implementation of the fourth aspect, in a fourth implementation of the fourth aspect of embodiments of this application, the sending module is further configured to receive third indication information from the receive end, where the third indication information is used to indicate the transmit end to send the signal by using a first modulation mode.

In this implementation, the transmit end sends the signal by using the modulation mode based on an indication of the third indication information, to avoid frequent switching in a transmission model adjustment process.

According to any one of the fourth aspect, or the first implementation of the fourth aspect to the fourth implementation of the fourth aspect, in a fifth implementation of the fourth aspect of embodiments of this application, the two channels of signals include a horizontal polarization signal and a vertical polarization signal.

According to a fifth aspect, an embodiment of this application provides a microwave communication device, where the microwave communication device is an indoor unit or an outdoor unit at a receive end.

According to the fifth aspect, in a first implementation of the fifth aspect of embodiments of this application, the indoor unit includes at least one processor and at least one memory, where the processor is connected to the memory; and the memory is configured to store a software program and data, and the processor is configured to execute instructions stored in the memory, so that the microwave communication device performs the method in any one of the first aspect or the implementations of the first aspect.

According to the fifth aspect, in a second implementation of the fifth aspect of embodiments of this application, the outdoor unit includes at least one processor and at least one memory, where the processor is connected to the memory; and the memory is configured to store a software program and data, and the processor is configured to execute instructions stored in the memory, so that the microwave communication device performs the method in any one of the first aspect or the implementations of the first aspect.

According to a sixth aspect, an embodiment of this application provides a microwave communication device, where the microwave communication device is an indoor unit or an outdoor unit at a transmit end.

According to the sixth aspect, in a first implementation of the sixth aspect of embodiments of this application, the indoor unit includes at least one processor and at least one memory, where the processor is connected to the memory; and the memory is configured to store a software program and data, and the processor is configured to execute instructions stored in the memory, so that the microwave communication device performs the method in any one of the second aspect or the implementations of the second aspect.

According to the sixth aspect, in a second implementation of the sixth aspect of embodiments of this application, the outdoor unit includes at least one processor and at least one memory, where the processor is connected to the memory; and the memory is configured to store a software program and data, and the processor is configured to execute instructions stored in the memory, so that the microwave communication device performs the method in any one of the second aspect or the implementations of the second aspect.

According to a seventh aspect, an embodiment of this application provides a chip, where the chip is located in an outdoor unit of a receive end, or located in an indoor unit of the receive end. The chip includes a processing unit and a storage unit. The storage unit is configured to store a program. The processing unit is configured to execute the program, to implement the method in any one of the first aspect or the implementations of the first aspect.

According to an eighth aspect, an embodiment of this application provides a chip, where the chip is located in an outdoor unit of a transmit end, or located in an indoor unit of the transmit end. The chip includes a processing unit and a storage unit. The storage unit is configured to store a program. The processing unit is configured to execute the program, to implement the method in any one of the second aspect or the implementations of the second aspect.

According to a ninth aspect, an embodiment of this application provides a microwave communication system, including a transmit end and a receive end, where the transmit end performs the method described in the first aspect and various implementations of the first aspect, and the receive end performs the method described in the second aspect and the various implementations of the second aspect.

According to a tenth aspect, an embodiment of this application provides a computer-readable storage medium, including instructions, where when the instructions are run on a computer, the computer is enabled to perform the method described in the first aspect and the implementations of the first aspect, or the method described in the second aspect and the implementations of the second aspect.

According to an eleventh aspect, an embodiment of this application provides a computer program product including instructions, where when the computer program product runs on a computer, the computer is enabled to perform the method described in the first aspect and the implementations of the first aspect, or the method described in the second aspect and the implementations of the second aspect.

As can be learned from the foregoing technical solutions, embodiments of this application have the following advantages.

In embodiments of this application, when the transmission performance of the any one of the 2N channels of signals is less than the first threshold, that is, when the data link between the transmit end and the receive end degrades to a specific extent, the receive end receives the two channels of signals that are in the 2N channels of signals and that are from the two second antennas and whose polarization directions are orthogonal. When the transmission performance of the two channels of signals is both greater than the second threshold, that is, when the data link between the transmit end and the receive end is recovered to a specific extent, the receive end resumes use of the at least 2N channels of signals. The two channels of signals not only carry data of another channel of signal, but also can reflect transmission performance of the another channel of signal. A combination of the two channels of signals is less affected by data link degradation than a combination of the 2N channels of signals. Therefore, even if the data link degradation occurs, the data transmission between the receive end and the transmit end is not interrupted. In addition, when the transmission performance of the two channels of signals is both greater than the second threshold, the receive end receives the 2N channels of signals through the N first antennas. This helps improve the system channel capacity, and improve the data transmission efficiency.

BRIEF DESCRIPTION OF DRAWINGS

To describe the technical solutions in embodiments of this application more clearly, the following briefly describes the accompanying drawings for describing the embodiments. It is clear that the accompanying drawings in the following descriptions show merely some embodiments of this application.

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Embodiments of this application provide a microwave transmission method and a related device, to improve a system channel capacity without interrupting data transmission.

For ease of understanding, the following first explains some technical terms in embodiments of this application.

Line of sight multiple input multiple output (line of sight multiple input multiple output, LOS-MIMO): The LOS-MIMO is a multiple input multiple output system based on line of sight propagation, and is used for intra-frequency point-to-point microwave transmission of a plurality of signals. The LOS-MIMO has advantages of increasing a channel capacity and improving system performance.

Rayleigh distance (rayleigh distance): In a MIMO system, a 90-degree phase difference is required between two co-polarization signals transmitted by two antennas at a transmit end to achieve orthogonality at a receive end. The phase difference is caused by a physical distance difference between the two antennas. Therefore, the Rayleigh distance is a distance between the two antennas when the two channels of signals are completely orthogonal.

Multipath effect (multipath effect): The multipath effect is a phenomenon in which after electromagnetic waves are transmitted along different paths, component fields arrive at the receive end at different time, and overlap with each other based on respective phases, and this causes interference, and causes an original signal to be distorted or erroneous. An indicator for measuring an impact degree of the multipath effect is a multipath notch depth.

The following describes an application scenario of the microwave transmission method provided in embodiments of this application.

Figure 1A:
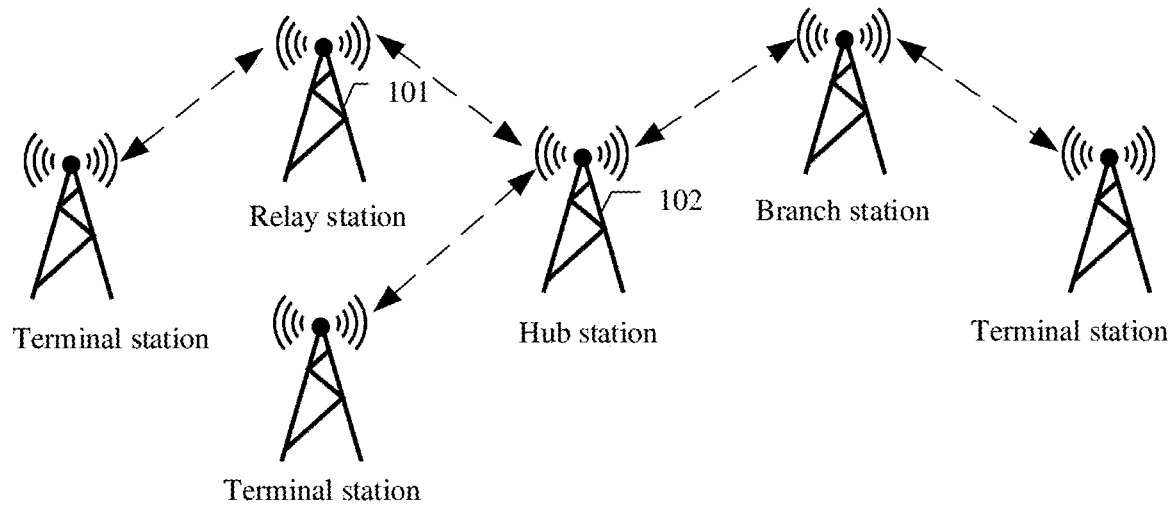
FIG. 1A is a diagram of an architecture of a microwave communication system according to an embodiment of this application.

The method provided in embodiments of this application is mainly applied to LOS-MIMO-based microwave communication, that is, data transmission between two point-to-point microwave communication devices. Specifically, as shown in FIG. 1A, a microwave communication system includes microwave communication devices such as a terminal station, a relay station, a hub station, and a branch station. The solutions provided in embodiments of this application may be applied to data transmission between the terminal station and the relay station, data transmission between the relay station and the hub station, data transmission between the hub station and the branch station, and the like. This is not specifically limited herein. For ease of subsequent description, data transmission between the relay station and the hub station in FIG. 1A is used as an example for description. Assuming that the relay station in FIG. 1A is a transmit end 101 and the hub station is a receive end 102, the transmit end 101 may transmit data to the receive end 102 through a plurality of antennas. In this process, microwave communication is easily impacted by a factor such as rain fade or atmospheric inhomogeneity, and this causes degradation of a data link between the transmit end 101 and the receive end 102. Consequently, the system channel capacity is reduced, and even service transmission is interrupted due to introduction of a latency. In this case, the solutions provided in embodiments of this application may be used. The degraded data link is first adjusted to a stable state, and then the data link is recovered, to avoid interruption of the data transmission between the receive end 102 and the transmit end 101, and improve the system channel capacity.

It should be understood that, in actual application, the transmit end 101 or the receive end 102 may be an independent microwave communication device, or may be a functional unit in the microwave communication device, or may be a chip that is disposed in the microwave communication device and integrates functions of the transmit end 101 and the receive end 102. This is not specifically limited herein.

When the transmit end 101 or the receive end 102 is a chip, the chip integrating the function of the transmit end 101 and the chip integrating the function of the receive end 102 are respectively located in two different microwave communication devices. More specifically, the chip may be disposed in an outdoor unit (outdoor unit, ODU), an indoor unit (indoor unit, IDU), or another functional unit in the microwave communication device. This is not specifically limited herein. Regardless of being used as the device or the chip, the transmit end 101 or the receive end 102 may be manufactured, sold, or used as an independent product.

Figure 1B:
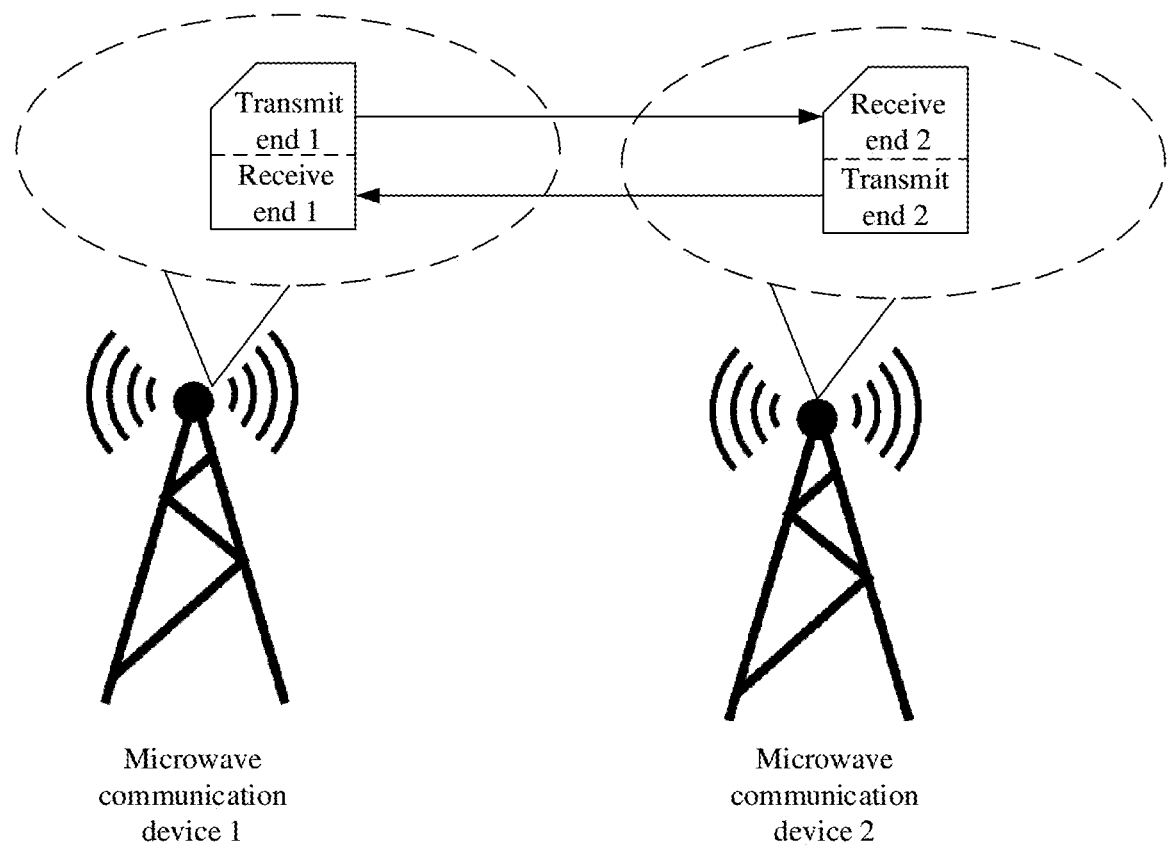
FIG. 1B is a diagram of an application scenario of a microwave communication system according to an embodiment of this application.
Figure 1C:
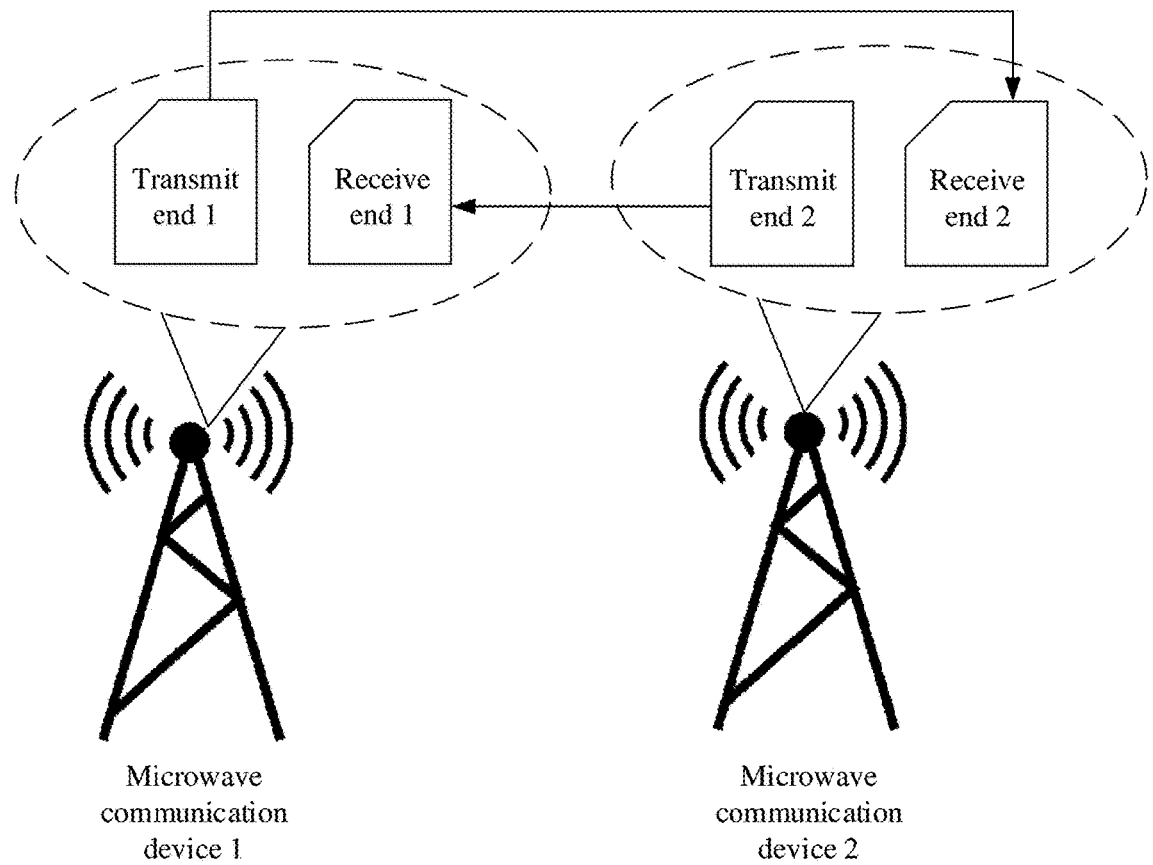
FIG. 1C is another diagram of an application scenario of a microwave communication system according to an embodiment of this application.

In actual application, the transmit end and the receive end may be chips. As shown in FIG. 1B, the transmit end and the receive end may be integrated into one chip, that is, the chip has both a function of the transmit end and a function of the receive end. In this case, one chip needs to be installed in each of a microwave communication device 1 and a microwave communication device 2. As shown in FIG. 1C, the transmit end and the receive end may alternatively be manufactured as two chips having different functions, that is, one chip has a function of the transmit end, and the other chip has a function of the receive end. In this case, a chip having the function of the transmit end and a chip having the function of the receive end need to be installed in each of the microwave communication device 1 and the microwave communication device 2. It should be understood that, in actual application, a quantity of chips in each of the microwave communication devices varies with different application scenarios, and is not specifically limited herein.

The solutions provided in embodiments of this application may be applied to a plurality of LOS-MIMO transmission models, that is, may be applied to an M×M-LOS-MIMO (M=4, 6 . . . ) transmission model. For ease of understanding, only a 4×4-LOS-MIMO-based transmission model is used as an example for description. However, the microwave transmission method in embodiments of this application is not limited to the 4×4-LOS-MIMO transmission model.

Figure 2:
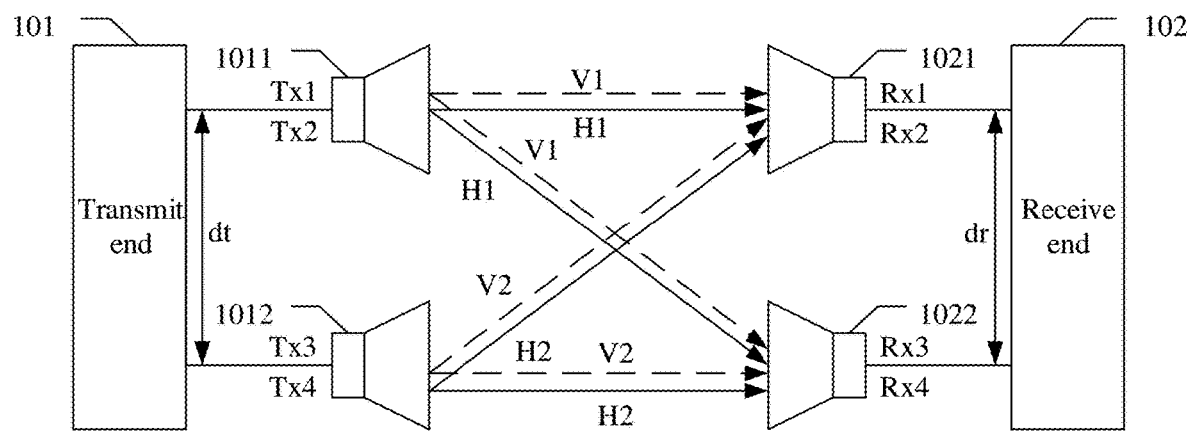
FIG. 2 is a principle diagram of a multiple-input multiple-output model according to an embodiment of this application.

As shown in FIG. 2, the 4×4-LOS-MIMO transmission model includes a transmit end 101 and a receive end 102. The transmit end 101 is configured with two antennas: an antenna 1011 and an antenna 1012. The receive end 102 is configured with two antennas: an antenna 1021 and an antenna 1022.

Each of the antenna 1011 and the antenna 1012 at the transmit end 101 includes two transmit channels (Tx channels), and each transmit channel may transmit a signal in one polarization direction. Therefore, the two transmit channels may transmit signals in two different polarization directions. The transmit antenna 1011 in FIG. 2 is used as an example. The transmit antenna 1011 includes two transmit channels: a transmit channel 1 (Tx1) and a transmit channel 2 (Tx2). The transmit channel 1 is configured to transmit a horizontal polarization signal (modem horizontal), for example, an H1 signal. The transmit channel 2 is configured to transmit a vertical polarization signal (modem vertical), for example, a V1 signal. Similarly, the transmit antenna 1012 also includes two transmit channels: a transmit channel 3 (Tx3), configured to transmit a vertical polarization signal, for example, an H2 signal; and a transmit channel 4, configured to transmit a horizontal polarization signal, for example, a V2 signal.

In addition, the antenna 1021 and the antenna 1022 in the receive end 102 each include two receive channels (Rx channels). For example, the receive antenna 1021 includes a receive channel 1 (Rx1) and a receive channel 2 (Rx2), and the receive antenna 1022 includes a receive channel 3 (Rx3) and a receive channel 4 (Rx4). Each receive channel may receive signals from four channels of a transmit end. For example, the receive channel 1 (Rx1) may receive a combined signal of H1+V1+H2+V2, demodulate the combined signal by using an equalizer, and output the V1 or H1 signal. For another example, the receive channel 3 (Rx3) may receive a combined signal of H1+V1+H2+V2, demodulate the combined signal by using the equalizer, and output the V2 or H2 signal.

Based on the foregoing transmission model, it can be known from a principle of transmit diversity that, data carried in the H1 signal transmitted by the transmit end 101 through the antenna 1011 is the same as data carried in the V1 signal, and data carried in the H2 signal transmitted by the transmit end 101 through the antenna 1012 is the same as data carried in the V2 signal. Therefore, that the receive end 102 receives one of the signals carrying the same data can ensure that a service is not interrupted. For example, the receive end 102 receives only the H1 signal and the H2 signal; or the receive end 102 receives only the H1 signal and the V2 signal; or the receive end 102 receives only the V1 signal and the H2 signal; or the receive end 102 receives only the V1 signal and the V2 signal. This special transmission model is referred to as a cross-polarization interference cancellation (cross-polarization interference cancellation, XPIC).

A transmission structure formed by two channels of signals from a same antenna is referred to as a same-plane XPIC. For example, the H1 signal and the V1 signal form a same-plane XPIC, or the H2 signal and the V2 signal form a same-plane XPIC. Two channels of signals from different antennas form another transmission structure. For example, the antenna 1021 in the receive end 102 receives the H1 signal and the V2 signal, or the antenna 1022 in the receive end 102 receives the H2 signal and the V1 signal. This transmission structure is also referred to as a hetero-plane XPIC in this embodiment. It should be understood that, this transmission structure is referred to as a hetero-plane XPIC only for ease of description in the following, but is not intended to limit this transmission structure. In addition, in the 4×4-LOS-MIMO transmission model shown in FIG. 2, the signals transmitted by the same antenna have a consistent transmission characteristic, and are affected nearly during transmission, to be specific, the H1 signal and the V1 signal have a consistent transmission characteristic, and are affected nearly during transmission; the H2 signal and the V2 signal have a consistent transmission characteristic, and are affected nearly during transmission. When the MIMO transmission model shown in FIG. 2 is adjusted to an XPIC transmission model, the receive end 102 needs to monitor a transmission characteristic of each signal. If the 4×4-LOS-MIMO transmission model is adjusted to the same-plane XPIC, some transmission paths cannot be represented. For example, if an antenna in the receive end 102 receives only the H1 signal and the V1 signal, the receive end cannot learn of transmission performance of the H2 signal and the V2 signal, and cannot determine recovery time. Similarly, if the antenna in the receive end 102 receives only the H2 signal and the V2 signal, the receive end cannot learn of transmission paths of the H1 signal and the V1 signal, and cannot determine the recovery time.

Therefore, the MIMO model shown in FIG. 2 is adjusted to the hetero-plane XPIC, for example, the antenna of the receive end is adjusted to receive the H1 signal and the V2 signal. Because the transmission characteristic of the H1 signal is consistent with the transmission characteristic of the V1 signal, and the transmission characteristic of the V2 signal is consistent with the transmission characteristic of the H2 signal, the receive end 102 may monitor transmission performance of all paths, and may determine whether to perform a recovery operation based on the transmission performance.

Based on the foregoing principle, the microwave transmission method provided in embodiment of this application can be used to avoid interruption of data transmission between the receive end and the transmit end, that is, avoid interruption of service transmission between the receive end and the transmit end. In addition, the MIMO transmission model may be recovered at a proper occasion, to improve the system channel capacity.

Figure 3:
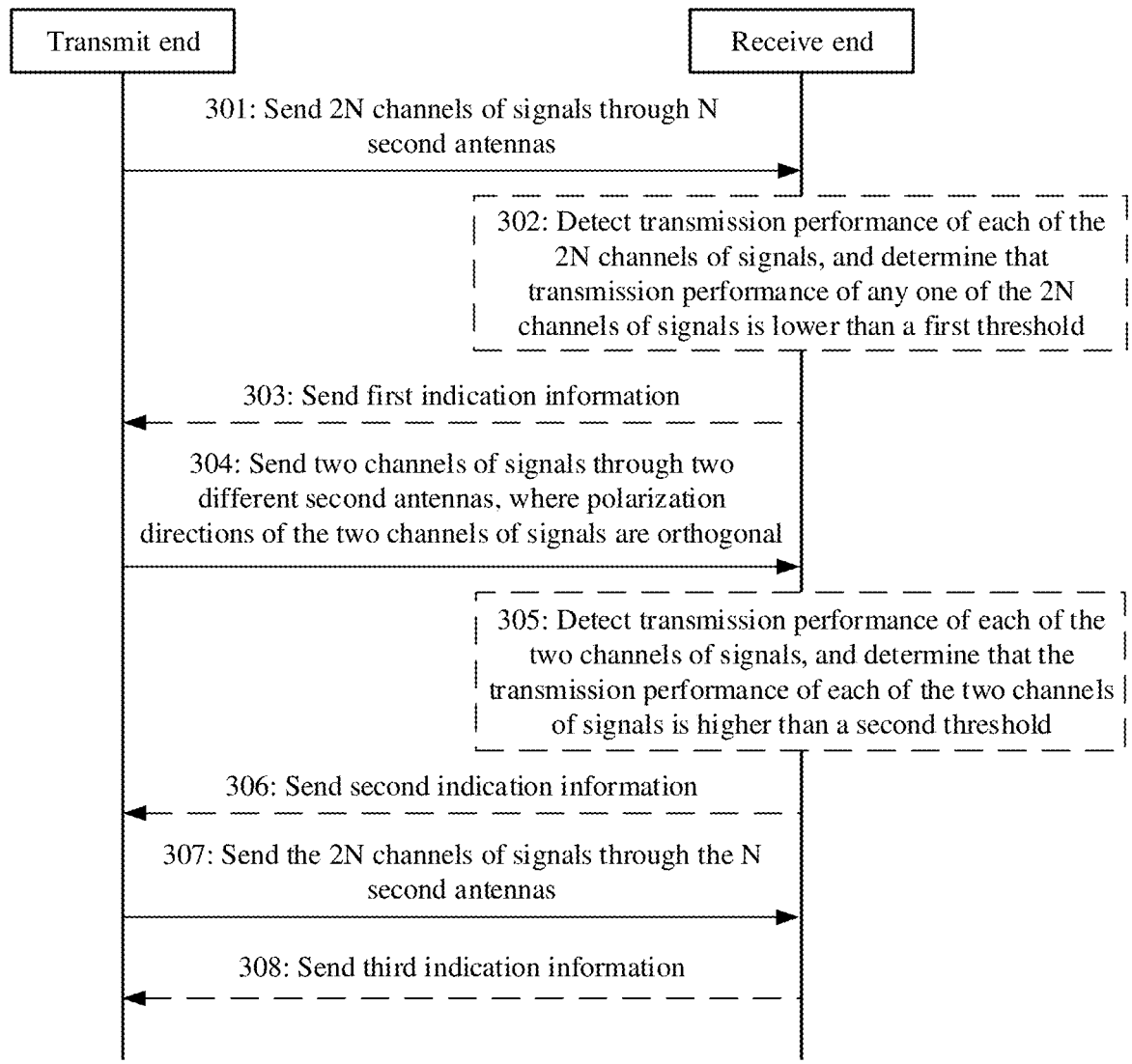
FIG. 3 is a flowchart of a microwave transmission method according to an embodiment of this application.

The foregoing describes the implementation principle of the microwave transmission method in embodiments of this application. The following describes a specific procedure of the microwave transmission method based on the MIMO transmission model and the XPIC transmission model. As shown in FIG. 3, the transmit end and the receive end perform the following steps.

301: The receive end receives 2N channels of signals through N first antennas.

In this embodiment, after a data link is established between the transmit end and the receive end, the transmit end may send a plurality of signals to the receive end through a plurality of antennas. Specifically, while the transmit end sends the 2N channels of signals to the receive end through N second antennas, the receive end receives the 2N channels of signals through the N first antennas. Each first antenna in the N first antennas at the receive end receives the 2N channels of signals, and each second antenna in the N second antennas at the transmit end sends two channels of signals. N is an integer greater than or equal to 2.

It should be understood that, based on the foregoing data transmission manner, a MIMO transmission model is formed between the transmit end and the receive end. For example, when N is equal to 2, 4×4-LOS-MIMO is formed between the transmit end and the receive end. In this case, the receive end may be the receive end 102 in FIG. 2, and the first antenna may be the antenna 1021 or the antenna 1022 in FIG. 2. The transmit end may be the transmit end 101 in FIG. 2, and the second antenna may be the antenna 1011 and the antenna 1012 in FIG. 2. A specific structure is shown in FIG. 2, and details are not described herein again. For another example, when N is equal to 3, 6×6-LOS-MIMO is formed between the transmit end and the receive end. A specific structure is similar to the structure shown in FIG. 2, and details are not described herein again.

302: The receive end detects transmission performance of each of the 2N channels of signals, and determines that transmission performance of any one of the 2N channels of signals is less than a first threshold.

In this embodiment, step 302 is an optional step.

While the receive end receives the 2N channels of signals, the receive end detects the transmission performance of each of the 2N channels of signals, to ensure that the receive end can take a response measure in time after degradation of a link between the transmit end and the receive end occurs.

In this embodiment, the foregoing transmission performance is used to reflect quality of a signal transmitted between the transmit end and the receive end. Optionally, the foregoing transmission performance is also used to reflect quality of a channel between the transmit end and the receive end. Specifically, the foregoing transmission performance includes an equivalent antenna distance or a multipath notch depth.

The equivalent antenna distance refers to a latency difference between signals from different antennas at the transmit end arriving at a same antenna at the receive end. FIG. 2 is used as an example. The equivalent antenna distance may be a latency difference between a V1 signal and an H2 signal arriving at the antenna 1021 at the receive end, or may be a latency difference between a V2 signal and an H1 signal arriving at the antenna 1022 at the receive end. When an atmospheric environment is stable, an electromagnetic wave is transmitted in a straight line. Therefore, the latency difference may be calculated based on an antenna height difference. Therefore, the foregoing equivalent antenna distance may be determined based on a ratio of an actual antenna distance to a Rayleigh antenna distance. The actual antenna distance is a physical distance between the N first antennas at the receive end. For ease of understanding, an example in which N is equal to 2 is used for description with reference to FIG. 2. The first antenna is the antenna 1021 or the antenna 1022 at the receive end 102, and a distance dr between the antenna 1021 and the antenna 1022 is an actual antenna distance at the receive end. Similarly, the second antenna is the antenna 1011 or the antenna 1012 at the transmit end 101, and a distance dt between the antenna 1011 and the antenna 1012 is an actual antenna distance at the transmit end. In addition, the Rayleigh antenna distance is a distance between two antennas when signals received by the two antennas are orthogonal.

The multipath notch depth is used to indicate that notch depths in frequency selective bands are different. That is, a signal is superimposed after passing through two paths, and the two paths have a phase difference and latency difference.

Optionally, in addition to detecting the equivalent antenna distance or the multipath notch depth, the receive end may detect a modulation mode of each signal. When the equivalent antenna distance or the multipath notch depth appears or reaches a specific threshold, the transmit end switches the modulation mode. Generally, a smaller equivalent antenna distance corresponds to a lower order of the modulation mode, and a larger multipath notch depth corresponds to a lower order of the modulation mode. Specifically, the transmit end may switch the modulation mode based on a correspondence list that is between a modulation mode and an equivalent antenna distance and that is stored in the transmit end, and the transmit end may further switch the modulation mode based on a correspondence list that is between a modulation mode and a multipath notch depth and that is stored in the transmit end. This is not specifically limited herein. When a modulation order of a modulation mode of the any one of the 2N channels of signals is lower than a modulation order of a preset modulation mode, the receive end further determines whether transmission performance of the channel of signal is less than the first threshold.

It should be understood that when the transmission performance detected by the receive end is different, the first threshold is different. When the receive end detects only the equivalent antenna distance, the first threshold is a first equivalent antenna distance, for example, the first equivalent antenna distance is 0.5. When the receive end detects only the multipath notch depth, the first threshold is a first multipath notch depth, for example, the first multipath notch depth is 3 dB or 5 dB. When the receive end detects the equivalent antenna distance and the multipath notch depth simultaneously, the first threshold includes the first equivalent antenna distance and the first multipath notch depth. In this case, when an equivalent antenna distance of a signal is less than the first equivalent antenna distance or a multipath notch depth of a signal is greater than the first multipath notch depth, the receive end may determine that transmission performance of the signal is less than the first threshold.

Further, when the transmission performance of the any one of the 2N channels of signals is less than the first threshold, the receive end performs step 303.

303: The receive end sends first indication information to the transmit end.

In this embodiment, step 303 is an optional step.

When the transmission performance of the any one of the 2N channels of signals is less than the first threshold, the receive end sends the first indication information to the transmit end, so that the transmit end reserves the two channels of signals in the 2N channels of signals, where the two channels of signals come from different second antennas of the transmit end, and polarization directions of the two channels of signals are orthogonal. Specifically, the first indication information is used to indicate the transmit end to use a first preset value as transmit power of (2N−2) channels of signals in the 2N channels of signals. Because the first preset value is less than the current transmit power of the transmit end, it may be understood that the first indication information indicates the transmit end to reduce the transmit power of the (2N−2) channels of signals in the 2N channels of signals to the first preset value. The (2N−2) channels of signals do not include the two channels of signals whose polarization directions are orthogonal and that are from the different second antennas at the transmit end. It may also be understood that the first indication information is used to indicate the transmit end to reduce transmit power of another signal other than the two channels of signals that need to be reserved. The first preset value may be a value greater than 0 or equal to 0. When the first preset value is 0, the transmit end disables the (2N−2) channels of signals. When the first preset value is a value greater than 0, the transmit end reduces the (2N−2) channels of signals to a low value, to avoid interference caused by the (2N−2) channels of signals to the two channels of signals.

304: The transmit end sends the two channels of signals to the receive end through two different second antennas, where polarization directions of the two channels of signals are orthogonal.

In this embodiment, after the transmit end receives the first indication information from the receive end, the transmit end adjusts the transmit power of the (2N−2) channels of signals to the first preset value based on an indication of the first indication information, and sends the two channels of signals to the receive end through the two different second antennas. Therefore, the receive end may respectively receive, from the two second antennas, the two channels of signals whose polarization directions are orthogonal.

Specifically, to ensure smooth switching of a system, no large jitter is generated inside an equalizer. When the transmit end adjusts the transmit power, the transmit end needs to gradually reduce the transmit power to a specific value, for example, the first preset value. In this case, the equalizer of the (2N−2) channels of signals converges to a value that is small enough, so that an admission condition for subsequently turning off the equalizer smoothly can be met. Optionally, if the transmit power has been reduced to the first preset value, the transmit end may further disable the (2N−2) channels of signals. For example, the transmit end may disable an outdoor unit of the (2N−2) channels of signals. If the transmit power is not reduced to the first preset value, the transmit end does not stop adjusting the transmit power until the transmit power reaches the first preset value.

Optionally, the transmit end may check whether the (2N−2) channels of signals are disabled, to avoid a link performance loss caused by abnormal disabling of the (2N−2) channels of signals.

In addition, the two channels of signals whose polarization directions are orthogonal include a horizontal polarization signal and a vertical polarization signal.

Figure 4A:
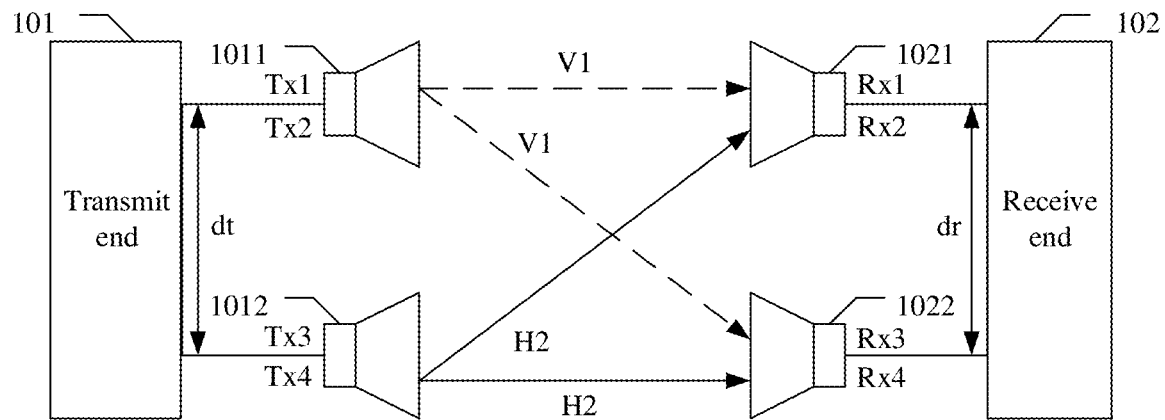
FIG. 4A is a schematic diagram of an embodiment of a microwave transmission method according to an embodiment of this application.
Figure 4B:
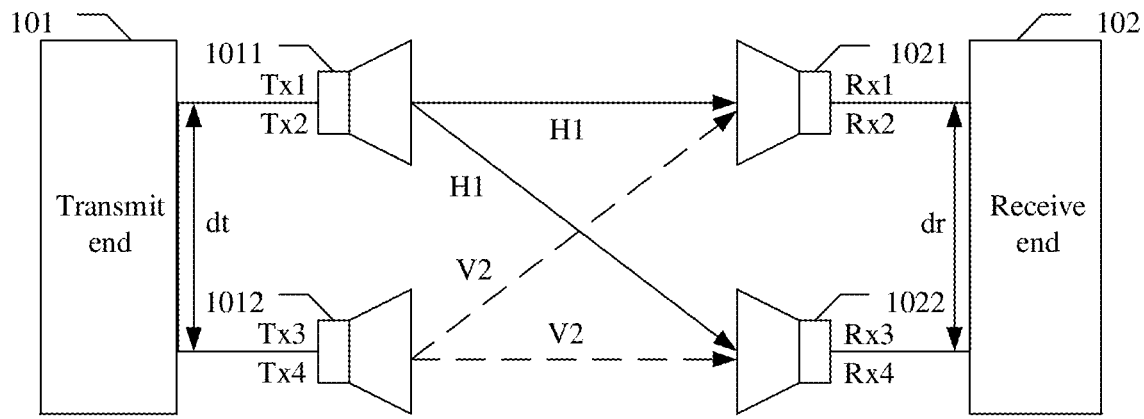
FIG. 4B is a schematic diagram of another embodiment of a microwave transmission method according to an embodiment of this application.

For ease of understanding, a 4×4-LOS-MIMO transmission model with N equal to 2 is used as an example for description. As shown in FIG. 2, the transmit end first sends, to the receive end, four channels of signals: an H1 signal, an H2 signal, a V1 signal, and a V2 signal. When the receive end detects that transmission performance of any one of the four channels of signals is less than the first threshold, the receive end indicates the transmit end to adjust transmit power of the other signals to the first preset value, and receives two mutually orthogonal signals from two different antennas of the transmit end. Specifically, as shown in FIG. 4A, the receive end may indicate the transmit end to disable the H2 signal and the V1 signal, and receive the H1 signal and the V2 signal from the transmit end. Alternatively, as shown in FIG. 4B, the receive end may indicate the transmit end to disable the H1 signal and the V2 signal, and receive the H2 signal and the V1 signal from the transmit end.

It can be known from related descriptions corresponding to FIG. 2 that, when the receive end receives the H1 signal and the V2 signal only from different second antennas of the transmit end, or receives the H2 signal and the V1 signal only from the different second antennas of the transmit end, a hetero-plane XPIC transmission model is formed. Compared with a combination of 2N channels of signals, a combination of the two channels of signals is less affected by data link degradation. In other words, compared with the LOS-MIMO transmission model, the hetero-plane XPIC transmission model is less affected by the data link degradation. Therefore, after a data transmission model between the transmit end and the receive end is adjusted from the LOS-MIMO transmission model to the hetero-plane XPIC transmission model, data transmission can still be maintained between the transmit end and the receive end and is not easily affected by a factor such as rain fade or atmospheric inhomogeneity. Therefore, a latency introduced due to link degradation can be avoided, and data transmission interruption can be avoided, that is, service interruption can be avoided.

In addition, after the receive end receives the two channels of signals whose polarization directions are orthogonal from two different second antennas, the receive end performs step 305.

305: The receive end detects transmission performance of each of the two channels of signals, and determines that the transmission performance of each of the two channels of signals is greater than a second threshold.

In this embodiment, step 305 is an optional step.

In this embodiment, because the foregoing hetero-plane XPIC transmission model is only a transition state when a link between the transmit end and the receive end degrades, if a channel capacity and data transmission efficiency between the transmit end and the receive end need to be improved, the receive end needs to recover the foregoing LOS-MIMO model at a proper occasion.

Specifically, the receive end may detect the transmission performance of each of the two channels of signals. The transmission performance is used to reflect quality of a signal transmitted between the transmit end and the receive end, and the transmission performance includes the equivalent antenna distance or the multipath notch depth. Specifically, for descriptions of the equivalent antenna distance and the multipath notch depth, refer to related descriptions in the step 302. Details are not described herein again.

It should be understood that when the transmission performance detected by the receive end is different, the second threshold is different. When the receive end detects only the equivalent antenna distance, the second threshold is a second equivalent antenna distance, which is, for example, 0.9. When the receive end detects only the multipath notch depth, the second threshold is a second multipath notch depth, which is, for example, 1 dB or 0. When the receive end detects the equivalent antenna distance and the multipath notch depth simultaneously, the second threshold includes the second equivalent antenna distance and the second multipath notch depth. In this case, when the equivalent antenna distance of the two channels of signals is greater than the second equivalent antenna distance or the multipath notch depth of the two channels of signals is less than the second multipath notch depth, the receive end may determine that transmission performance of the two channels of signals is greater than the second threshold.

When the transmission performance of the two channels of signals is both greater than the second threshold, the receive end performs step 306.

306: The receive end sends second indication information to the transmit end.

In this embodiment, step 306 is an optional step.

When the transmission performance of the two channels of signals is both greater than the second threshold, the receive end sends the second indication information to the transmit end, so that the transmit end recovers the 2N channels of signals. Specifically, the second indication information is used to indicate the transmit end to use a second preset value as the transmit power of the (2N−2) channels of signals, and the second preset value is greater than the first preset value.

307: The transmit end sends the 2N channels of signals to the receive end through the N second antennas.

In this embodiment, after the transmit end receives the second indication information from the receive end, the transmit end adjusts the transmit power to the second preset value based on an indication of the second indication information. Because the second preset value is greater than the first preset value, it may be understood that the transmit end gradually increases the transmit power of the (2N−2) channels of signals to the second preset value based on the second indication information, and sends the 2N channels of signals to the receive end at power of the second preset value through the N second antennas. Therefore, the receive end may receive the 2N channels of signals through the N first antennas.

Specifically, the transmit end first determines a modulation parameter, to ensure stability of link performance in a subsequent operation process. Then, the transmit end enables the (2N−2) channels of signals, and enables an outdoor unit corresponding to the (2N−2) channels of signals. Then, the transmit end gradually increases the transmit power to the second preset value, so that the transmit end sends the 2N channels of signals to the receive end at the power of the second preset value through the N second antennas.

In this embodiment, when the transmission performance of the two channels of signals is both greater than the second threshold, that is, when the data link between the transmit end and the receive end is recovered to a specific extent, the receive end resumes use of the at least 2N channels of signals, to improve the system channel capacity, and improve data transmission efficiency.

308: The receive end sends third indication information to the transmit end.

In this embodiment, step 308 is an optional step. When the receive end performs step 308, the receive end may perform step 308 after step 303 and before step 304, or the receive end may perform step 308 after step 306 and before step 307.

The third indication information is used to indicate the transmit end to send a signal by using a first modulation mode. After the transmit end receives the third indication information, the transmit end sends a signal to the receive end by using the first modulation mode. Specifically, when step 308 is performed after step 303 and before step 304, the transmit end modulates the two channels of signals by using the first modulation mode; or when step 308 is performed after step 306 and before step 307, the transmit end modulates the 2N channels of signals by using the first modulation mode.

In such an implementation, the transmit end may be enabled to fix the modulation mode, to avoid a case in which the transmit end frequently switches the modulation mode when the transmit end is in an adaptive switching state.

In this embodiment of this application, when the transmission performance of the any one of the 2N channels of signals is less than the first threshold, that is, when the data link between the transmit end and the receive end degrades to a specific extent, the receive end receives the two channels of signals that are in the 2N channels of signals and that are from the two second antennas and whose polarization directions are orthogonal. When the transmission performance of the two channels of signals is both greater than the second threshold, that is, when the data link between the transmit end and the receive end is recovered to a specific extent, the receive end resumes use of the at least 2N channels of signals. The two channels of signals not only carry data of another channel of signal, but also can reflect transmission performance of the another channel of signal. A combination of the two channels of signals is less affected by data link degradation than a combination of the 2N channels of signals. Therefore, even if the data link degradation occurs, data transmission between the receive end and the transmit end is not interrupted. In addition, when the transmission performance of the two channels of signals is both greater than the second threshold, the receive end receives the 2N channels of signals through the N first antennas. This helps improve the system channel capacity, and improve the data transmission efficiency.

The foregoing describes the microwave transmission method provided in embodiments of this application. The following describes a specific structure of a device used in the microwave transmission method.

Figure 5A:
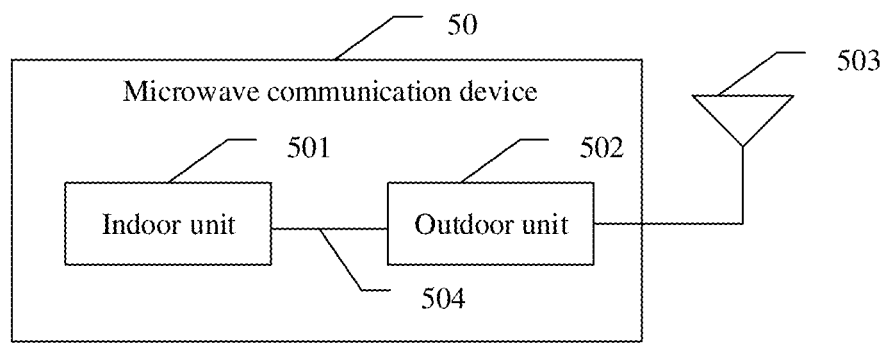
FIG. 5A is a schematic diagram of a structure of a microwave communication device according to an embodiment of this application.

As shown in FIG. 5A, an embodiment of this application provides a schematic diagram of a structure of a microwave communication device 50. The transmit end or the receive end in the method embodiment corresponding to FIG. 3 may be based on the structure of the microwave communication device 50 shown in FIG. 5A in this embodiment.

The microwave communication device 50 includes an indoor unit 501, an outdoor unit 502, an antenna 503, and an intermediate frequency cable 504. The indoor unit 501 is configured to implement service access, multiplexing/demultiplexing, modulation/demodulation, and convert a service signal into an intermediate frequency analog signal. The outdoor unit 502 is configured to implement signal frequency conversion and signal amplification. The antenna 503 is configured to convert a radio frequency signal into an electromagnetic wave, and radiate the electromagnetic wave to the air; or configured to receive an electromagnetic wave, convert the electromagnetic wave into a radio frequency signal, and transmit the radio frequency signal to the outdoor unit 502.

Specifically, the indoor unit 501 includes at least one processor and at least one memory. The processor is connected to the memory. Optionally, the indoor unit 501 is connected to a network interface through a connection apparatus, where the connection apparatus may include various interfaces, transmission lines, buses, or the like. This is not limited in this embodiment.

Further, the processor may be a baseband processor, or may be a central processing unit (central processing unit, CPU). The baseband processor and the CPU may be integrated or separated. The processor may be configured to implement various functions for the microwave communication device 50, for example, configured to process a communication protocol and communication data, or configured to control the entire microwave communication device 50, execute a software program, and process data of the software program; or configured to assist in completing a computing processing task, for example, processing an analog signal or a digital signal; or the processor may be configured to implement one or more of the foregoing functions.

In addition, the memory is mainly configured to store a software program and data. The memory may exist independently and be connected to the processor. Optionally, the memory and the processor may be integrated, for example, integrated into one or more chips. The memory can store program code for executing the technical solutions in embodiments of this application, and the processor controls the execution. Various types of executed computer program code may also be considered as drivers for the processor. It should be understood that FIG. 5A in this embodiment shows only one memory and one processor. However, in actual application, the microwave communication device 50 may have a plurality of processors or memories. This is not specifically limited herein. In addition, the memory may also be referred to as a storage medium, a storage device, or the like. The memory may be a storage element located on a same chip as the processor, namely, an on-chip storage element, or an independent storage element. This is not limited in this embodiment of this application.

In addition, the outdoor unit 502 includes a transceiver, and the transceiver is connected to the antenna 503. Specifically, the transceiver may be configured to support receiving or sending of the radio frequency signal between the microwave communication device 50 and another microwave communication device. The transceiver includes a transmitter machine Tx and a receiver machine Rx. Specifically, one or more antennas 503 may receive the radio frequency signal. The receiver machine Rx of the transceiver is configured to receive the radio frequency signal from the antenna 503, convert the radio frequency signal into a digital baseband signal or a digital intermediate frequency signal, and provide the digital baseband signal or the digital intermediate frequency signal for the processor in the indoor unit 501, so that the processor further processes the digital baseband signal or the digital intermediate frequency signal, for example, performs demodulation processing and decoding processing. In addition, the transmitter machine Tx of the transceiver is further configured to receive a modulated digital baseband signal or digital intermediate frequency signal from the processor, convert the modulated digital baseband signal or digital intermediate frequency signal into the radio frequency signal, and send the radio frequency signal through one or more antennas. Specifically, the receiver machine Rx may selectively perform one or more levels of down-mixing processing and analog-to-digital conversion processing on the radio frequency signal to obtain the digital baseband signal or the digital intermediate frequency signal, and a sequence of the down-mixing processing and the analog-to-digital conversion processing is adjustable. The transmitter machine Tx may selectively perform one or more levels of up-mixing processing and digital-to-analog conversion processing on the modulated digital baseband signal or digital intermediate frequency signal to obtain the radio frequency signal, and a sequence of the up-mixing processing and the digital-to-analog conversion processing is adjustable. The digital baseband signal and the digital intermediate frequency signal may be collectively referred to as a digital signal. It should be understood that the transceiver may also be referred to as a transceiver unit, a transceiver machine, a transceiver apparatus, or the like. Optionally, a component configured to implement a receiving function in the transceiver unit may be considered as a receiving unit, and a component configured to implement a sending function in the transceiver unit may be considered as a sending unit. To be specific, the transceiver unit includes the receiving unit and the sending unit, the receiving unit may also be referred to as a receiver machine, a receiver, an input port, a receiver circuit, or the like, and the sending unit may be referred to as a transmitter machine, a transmitter, an output port, a transmitter circuit, or the like.

In addition, the antenna 503 may be a parabolic antenna or a Cassegrain antenna. This is not specifically limited herein.

In actual application, the outdoor unit 502 and the antenna 503 in the microwave communication device 50 may be directly mounted on the microwave communication device 50 (direct mounting) or connected to the microwave communication device 50 by using accessories (separate mounting). This is not specifically limited herein.

Figure 5B:
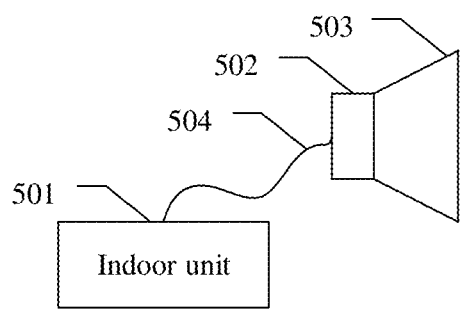
FIG. 5B is a schematic diagram of another structure of a microwave communication device according to an embodiment of this application.

When the direct mounting is adopted, an installation structure of the microwave communication device is shown in FIG. 5B. In this case, the outdoor unit 502 and the antenna 503 are buckled together by using a special connection apparatus and disposed at a high position. The outdoor unit 502 is connected to the indoor unit 501 through an intermediate frequency cable 504.

Figure 5C:
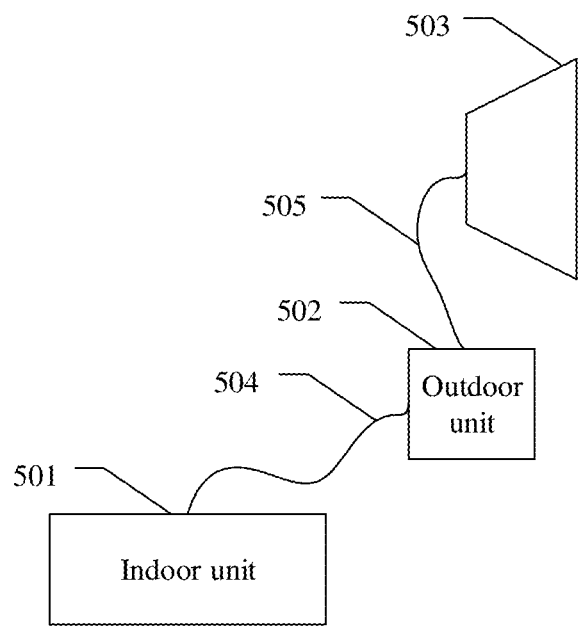
FIG. 5C is a schematic diagram of another structure of a microwave communication device according to an embodiment of this application.

When the separate mounting is adopted, an installation structure of the microwave communication device is shown in FIG. 5C. In this case, the outdoor unit 502 is connected to the antenna 503 by using a flexible waveguide 505, and the outdoor unit 502 and the antenna 503 are arranged side by side at a high position. The outdoor unit 502 is connected to the indoor unit 501 through the intermediate frequency cable 504.

It should be understood that the transmit end and the receive end described in the foregoing embodiments may be functional units in the indoor unit 501, or may be functional units in the outdoor unit 502. This is not specifically limited herein.

When the transmit end and the receive end in the foregoing embodiments may be the functional units in the indoor unit 501, or when the indoor unit 501 is configured as the receive end or the transmit end in FIG. 3, reference may be made to the following implementation.

In an embodiment, the indoor unit 501 may be configured as the receive end in FIG. 3, the antenna 503 may be configured as the first antenna, and the outdoor unit 502 is configured to transmit a signal processed by the indoor unit 501 to the antenna 503 for transmission, or transmit a signal received by the antenna 503 to the indoor unit 501 for processing. For example, the outdoor unit 502 may receive 2N channels of signals through N antennas 503, so that the outdoor unit 502 transmits the 2N channels of signals to the indoor unit 501 for processing. Then, the indoor unit 501 detects transmission performance of each of the 2N channels of signals, and determines that transmission performance of any one of the 2N channels of signals is less than a first threshold. For another example, the outdoor unit 502 may receive two channels of signals whose polarization directions are orthogonal through N antennas 503, so that the outdoor unit 502 transmits the 2N channels of signals to the indoor unit 501 for processing. Then, the indoor unit 501 detects transmission performance of each of the two channels of signals, and determines that the transmission performance of each of the two channels of signals is both greater than a second threshold.

Optionally, the indoor unit 501 may alternatively generate indication information (for example, first indication information, second indication information, or third indication information), and send the indication information to another microwave communication device (for example, a transmit end) through the antenna 503.

In another embodiment, the indoor unit 501 may be configured as the transmit end in FIG. 3, the antenna 503 may be configured as the second antenna, and the outdoor unit 502 is configured to transmit a signal processed by the indoor unit 501 to the antenna 503 for transmission, or transmit a signal received by the antenna 503 to the indoor unit 501 for processing. Specifically, the indoor unit 501 may send a signal to another microwave communication device (for example, a receive end) through the antenna 503. For example, the indoor unit 501 may send the 2N channels of signals to the receive end through the N antennas 503. For another example, the indoor unit 501 sends the two channels of signals to the receive end through two different antennas 503.

Optionally, the indoor unit 501 may alternatively receive a signal from another microwave communication device (for example, the receive end) through the N antennas 503. For example, the indoor unit 501 may alternatively receive the first indication information, the second indication information, or the third indication information from the receive end through the antenna 503.

In addition to the foregoing implementations, when the transmit end or receive end is used as the functional unit in the outdoor unit 502, in addition to the transceiver, the outdoor unit 502 further includes at least one processor and at least one memory, where the processor is connected to the memory. Specifically, functions of the processor and the memory are similar to those of the processor and the memory in the indoor unit 501, and details are not described herein again.

When the transmit end and the receive end in the foregoing embodiments may be the functional units in the outdoor unit 502, or when the outdoor unit 502 is configured as the receive end or the transmit end in FIG. 3, reference may be made to the following implementation.

In an embodiment, the outdoor unit 502 may be configured as the receive end in FIG. 3, and the antenna 503 may be configured as the first antenna, so that the outdoor unit 502 may receive a signal through the antenna 503 and process the received signal. For example, the outdoor unit 502 may receive the 2N channels of signals through the N antennas 503, detect the transmission performance of each of the 2N channels of signals, and determine that the transmission performance of the any one of the 2N channels of signals is less than the first threshold. For another example, the outdoor unit 502 may receive the two channels of signals whose polarization directions are orthogonal through the N antennas 503, detect the transmission performance of each of the two channels of signals, and determine that the transmission performance of each of the two channels of signals is greater than the second threshold.

Optionally, the outdoor unit 502 may alternatively send information, for example, the first indication information, the second indication information, or the third indication information, to another microwave communication device (for example, the transmit end) through the antenna 503.

In another embodiment, the outdoor unit 502 may be configured as the transmit end in FIG. 3, and the antenna 503 may be configured as the second antenna, so that the outdoor unit 502 may send a signal to another microwave communication device (for example, the receive end) through the antenna 503. For example, the outdoor unit 502 may send the 2N channels of signals to the receive end through the N antennas 503. For another example, the outdoor unit 502 sends the two channels of signals to the receive end through two different antennas 503.

Optionally, the outdoor unit 502 may alternatively receive a signal from another microwave communication device (for example, the receive end) through the N antennas 503. For example, the outdoor unit 502 may alternatively receive the first indication information, the second indication information, or the third indication information from the receive end through the antenna 503.

Optionally, the indoor unit 501 and the outdoor unit 502 may be integrated as a whole. For example, the processor, the memory, and another functional unit in the indoor unit 501 are integrated in the outdoor unit 502. In addition, the microwave communication device 50 may include only the outdoor unit 502 and the antenna 503.

No matter whether the transmit end and the receive end are functional units in the indoor unit 501 or functional units in the outdoor unit 502, both the indoor unit 501 and the outdoor unit 502 may be manufactured, sold, or used as independent products.

Figure 6:
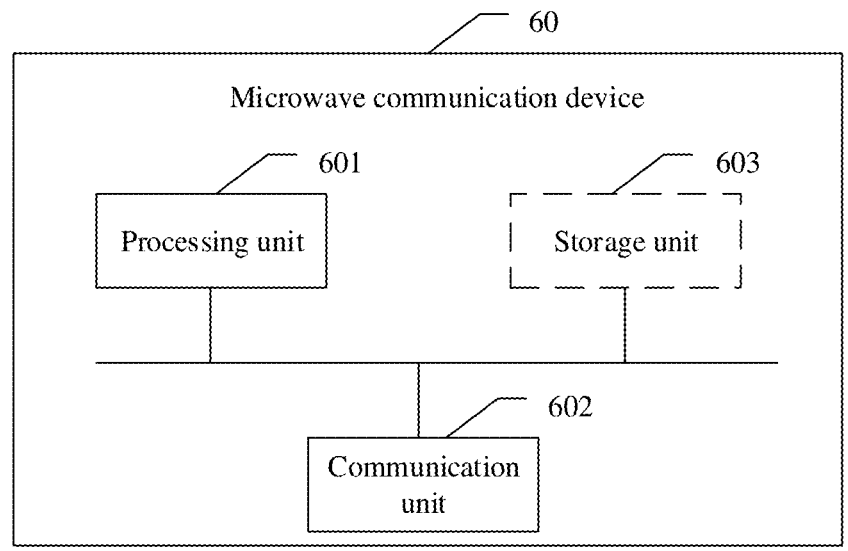
FIG. 6 is a schematic diagram of another structure of a microwave communication device according to an embodiment of this application.

In addition, when the receive end is a chip product, the receive end may be a structure of a microwave communication device 60 shown in FIG. 6. The receive end in the method embodiment corresponding to FIG. 3 may be based on the structure of the microwave communication device 60 shown in FIG. 6 in this embodiment.

The microwave communication device 60 includes a processing unit 601, a communication unit 602, and a storage unit 603. The microwave communication device 60 may be the chip in the indoor unit 501 or the chip in the outdoor unit 502 in FIG. 5A.

The processing unit 601 may be a baseband processor or a central processing unit. The baseband processor is mainly configured to process a communication protocol and communication data, and the central processing unit is mainly configured to control the entire microwave communication device 60, execute a software program, and process data of the software program. Functions of the baseband processor and the central processing unit may be integrated into the processing unit 601. A person skilled in the art may understand that the baseband processor and the central processing unit may alternatively be processors independent of each other, and are interconnected by using a technology such as a bus.

The communication unit 602 may be an input or output interface, a pin, a circuit, or the like.

The storage unit 603 may be a register, a cache, a random access memory (random access memory, RAM), or the like. The storage unit 603 may be integrated with the processing unit 601. The storage unit 603 may be a read-only memory (read-only memory, ROM) or another type of static storage device that can store static information and instructions. The storage unit 603 may be independent of the processing unit 601.

In a possible design, the processing unit 601 may include instructions, and the instructions may be run on the processor, so that the microwave communication device 60 is enabled to perform the method performed by the receive end in the foregoing embodiments.

In another possible design, the storage unit 603 stores instructions, and the instructions may be run on the processing unit 601, so that the microwave communication device 60 is enabled to perform the method performed by the receive end in the foregoing embodiments. Optionally, the storage unit 603 may alternatively store data. Optionally, the processing unit 601 may also store instructions and/or data.

Specially, the communication unit 602 is configured to receive 2N channels of signals through N first antennas, where the 2N channels of signals are respectively from N second antennas of a transmit end, each first antenna of the N first antennas receives the 2N channels of signals, and each second antenna of the N second antennas sends two channels of signals, where N is an integer greater than or equal to 2.

The communication unit 602 is further configured to: when transmission performance of any one of the 2N channels of signals is less than a first threshold, respectively receive two channels of signals from two second antennas, where polarization directions of the two channels of signals are orthogonal.

The communication unit 602 is further configured to: when transmission performance of the two channels of signals is both greater than a second threshold, receive the 2N channels of signals through the N first antennas.

In addition, the processing unit 601 is configured to detect transmission performance of each of the 2N channels of signals, and determine that the transmission performance of the any one of the 2N channels of signals is less than the first threshold.

The processing unit 601 is configured to detect transmission performance of each of the two channels of signals, and determine that the transmission performance of each of the 2N channels of signals is both greater than the second threshold.

Optionally, the communication unit 602 is further configured to send first indication information to the transmit end, where the first indication information is used to indicate the transmit end to use a first preset value as transmit power of (2N–2) channels of signals in the 2N channels of signals, and the (2N–2) channels of signals do not include the two channels of signals whose polarization directions are orthogonal.

Optionally, the processing unit 601 is further configured to: when a modulation order of a modulation mode of the any one of the 2N channels of signals is lower than a modulation order of a preset modulation mode, determine the transmission performance of the signal.

Optionally, the communication unit 602 is further configured to send second indication information to the transmit end, where the second indication information is used to indicate the transmit end to use a second preset value as transmit power of the (2N–2) channels of signals.

Optionally, the communication unit 602 is further configured to send third indication information to the transmit end, where the third indication information is used to indicate the transmit end to send the signal by using a first modulation mode.

For other steps, refer to steps performed by a terminal device in the foregoing embodiments. Details are not described herein again.

In this embodiment, when the transmission performance of the any one of the 2N channels of signals is less than the first threshold, the communication unit 602 in the microwave communication device 60 receives the two channels of signals whose polarization directions are orthogonal and that are from the two second antennas in the 2N channels of signals. When the transmission performance of the two channels of signals is both greater than the second threshold, the microwave communication device 60 resumes use of the at least 2N channels of signals. The two channels of signals not only carry data of another channel of signal, but also can reflect transmission performance of the another channel of signal. A combination of the two channels of signals is less affected by data link degradation than a combination of the 2N channels of signals. Therefore, even if the link degradation occurs, data transmission between the microwave communication device 60 and another microwave communication device is not interrupted. In addition, when the transmission performance of the two channels of signals is both greater than the second threshold, the microwave communication device 60 receives the 2N channels of signals through the N first antennas. This helps improve a system channel capacity, and improve data transmission efficiency.

Figure 7:
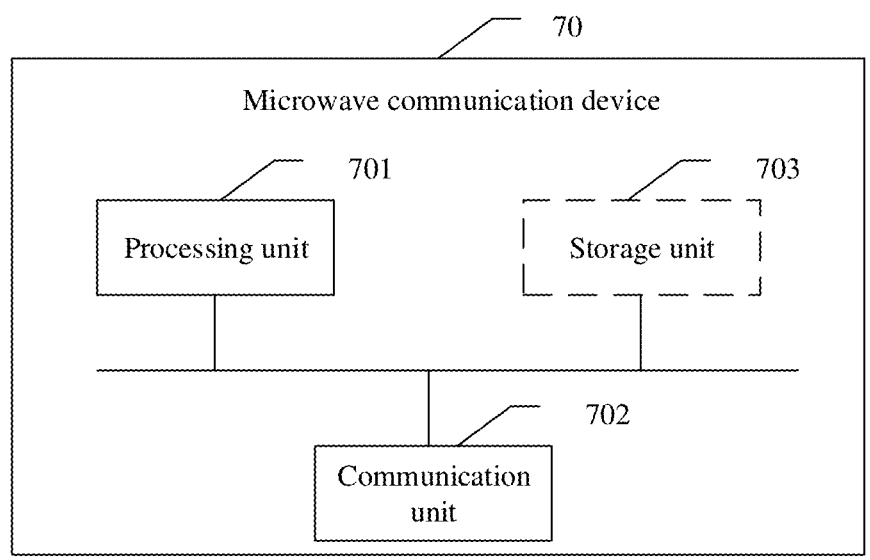
FIG. 7 is a schematic diagram of another structure of a microwave communication device according to an embodiment of this application.

When the transmit end is a chip product, the transmit end may be a structure of a microwave communication device 70 shown in FIG. 7. The transmit end in the method embodiment corresponding to FIG. 3 may be based on the structure of the microwave communication device 70 shown in FIG. 7 in this embodiment.

The microwave communication device 70 includes a processing unit 701, a communication unit 702, and a storage unit 703. The microwave communication device 70 may be the chip in the indoor unit 501 or the chip in the outdoor unit 502 in FIG. 5A.

The processing unit 701 may be a baseband processor or a central processing unit. The baseband processor is mainly configured to process a communication protocol and communication data, and the central processing unit is mainly configured to control the entire microwave communication device 70, execute a software program, and process data of the software program. Functions of the baseband processor and the central processing unit may be integrated into the processing unit 701. A person skilled in the art may understand that the baseband processor and the central processing unit may alternatively be processors independent of each other, and are interconnected by using a technology such as a bus.

The communication unit 702 may be an input or output interface, a pin, a circuit, or the like.

The storage unit 703 may be a register, a cache, a random access memory (random access memory, RAM), or the like. The storage unit 703 may be integrated with the processing unit 701. The storage unit 703 may be a read-only memory (read-only memory, ROM) or another type of static storage device that can store static information and instructions. The storage unit 703 may be independent of the processing unit 701.

In a possible design, the processing unit 701 may include instructions, and the instructions may be run on the processor, so that the microwave communication device 70 is enabled to perform the method performed by the receive end in the foregoing embodiments.

In another possible design, the storage unit 703 stores instructions, and the instructions may be run on the processing unit 701, so that the microwave communication device 70 is enabled to perform the method performed by the receive end in the foregoing embodiments. Optionally, the storage unit 703 may alternatively store data. Optionally, the processing unit 701 may also store instructions and/or data.

Specifically, the communication unit 702 is configured to send 2N channels of signals to a receive end through N second antennas, where N is an integer greater than or equal to 2.

The communication unit 702 is further configured to: when receiving first indication information from the receive end, send two channels of signals to the receive end through two different second antennas, where polarization directions of the two channels of signals are orthogonal.

The communication unit 702 is further configured to: when receiving second indication information from the receive end, send the 2N channels of signals to the receive end through the N second antennas.

In addition, the processing unit 701 is configured to: when receiving the first indication information from the receive end, reduce transmit power of (2N−2) channels of signals in the 2N channels of signals to a first preset value, where the (2N−2) channels of signals do not include the two channels of signals.

The processing unit 701 is further configured to: when receiving the second indication information from the receive end, increase the transmit power of the (2N−2) channels of signals to a second preset value.

Optionally, the communication unit 702 is further configured to receive third indication information from the receive end, where the third indication information is used to indicate the transmit end to send the signal by using a first modulation mode.

Optionally, the processing unit 701 is further configured to adjust a modulation mode to the first modulation mode based on the third indication information.

For other steps, refer to steps performed by a terminal device in the foregoing embodiments. Details are not described herein again.

In this embodiment, when transmission performance of any one of the 2N channels of signals is less than the first threshold, the receive end receives the two channels of signals whose polarization directions are orthogonal and that are from the two second antennas in the 2N channels of signals. When transmission performance of the two channels of signals is both greater than a second threshold, the receive end resumes use of the at least 2N channels of signals. The two channels of signals not only carry data of another channel of signal, but also can reflect transmission performance of the another channel of signal. A combination of the two channels of signals is less affected by data link degradation than a combination of the 2N channels of signals. Therefore, even if the link degradation occurs, data transmission between the microwave communication device 70 and another microwave communication device is not interrupted. In addition, when the transmission performance of the two channels of signals is both greater than the second threshold, the microwave communication device 70 receives the 2N channels of signals through the N first antennas. This helps improve a system channel capacity, and improve data transmission efficiency.

It may be clearly understood by a person skilled in the art that, for the purpose of convenient and brief descriptions, for a detailed working process of the foregoing system, apparatus, and unit, reference may be made to a corresponding process in the foregoing method embodiments, and details are not described herein.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A microwave transmission method, comprising:
    receiving, by a receive end, 2N channels of signals through N first antennas, wherein the 2N channels of signals are respectively from N second antennas of a transmit end, each first antenna of the N first antennas receives the 2N channels of signals, each second antenna of the N second antennas sends two channels of signals, and N is an integer greater than or equal to 2;
    when transmission performance of any one of the 2N channels of signals is less than a first threshold, respectively receiving, by the receive end, two channels of signals from two of the second antennas, wherein polarization directions of the two channels of signals are orthogonal; and
    when transmission performance of the two channels of signals is both greater than a second threshold, receiving, by the receive end, the 2N channels of signals through the N first antennas,
    wherein the transmission performance comprises one or more of the following: an equivalent antenna distance or a multipath notch depth, wherein the equivalent antenna distance is a ratio of an actual antenna distance to a Rayleigh antenna distance, the actual antenna distance is a physical distance between two of the N first antennas of the receive end, and the multipath notch depth is used to indicate a multipath notch degradation degree.

2. The method according to claim 1, wherein before the respectively receiving, by the receive end, two channels of signals from two different second antennas of the second antennas, the method further comprises:
    sending, by the receive end, first indication information to the transmit end, wherein the first indication information is used to indicate the transmit end to use a first preset value as transmit power of (2N−2) channels of signals in the 2N channels of signals, and the (2N−2) channels of signals do not comprise the two channels of signals.

3. The method according to claim 2, wherein the method further comprises:
    sending, by the receive end, second indication information to the transmit end, wherein the second indication information is used to indicate the transmit end to use a second preset value as transmit power of the (2N−2) channels of signals, and the second preset value is greater than the first preset value.

4. The method according to claim 3, wherein the method further comprises:
    sending, by the receive end, third indication information to the transmit end, wherein the third indication information is used to indicate the transmit end to send the any one of the 2N channels of signals by using a first modulation mode.

5. The method according to claim 3, wherein whether the transmit end receives the first indication information or the second indication information is based on a modulation order of a modulation mode of the any one of the 2N channels of signals.

6. The method according to claim 3, wherein whether the transmit end receives the first indication information or the second indication information is based on the transmission performance of the any one of the 2N channels of signals received by the receive end and a modulation order of a modulation mode of the any one of the 2N channels of signals.

7. The method according to claim 1, wherein the method further comprises:
    when a modulation order of a modulation mode of the any one of the 2N channels of signals is lower than a modulation order of a preset modulation mode, determining, by the receive end, the transmission performance of the any one of the 2N channels of signals.

8. The method according to claim 1, wherein the two channels of signals comprise a horizontal polarization signal and a vertical polarization signal.

9. The method according to claim 1, wherein the method further comprises:
- determining a modulation order of a modulation mode of the any one of the 2N channels of signals; and
- determining the transmission performance of the any one of the 2N channels of signals based on the modulation order of the modulation mode.

10. A microwave transmission method, comprising:
- sending, by a transmit end, 2N channels of signals to a receive end through N second antennas, wherein each second antenna of the N second antennas sends two channels of signals, and N is an integer greater than or equal to 2;
- in response to the transmit end receiving first indication information from the receive end, sending, by the transmit end, the two channels of signals to the receive end through two of the second antennas, wherein polarization directions of the two channels of signals are orthogonal; and
- in response to the transmit end receiving second indication information from the receive end, sending, by the transmit end, the 2N channels of signals to the receive end through the N second antennas, wherein
- the first indication information is used to indicate the transmit end to use a first preset value as transmit power of (2N−2) channels of signals in the 2N channels of signals, and the (2N−2) channels of signals do not comprise the two channels of signals,
- whether the transmit end receives the first indication information or the second indication information is based on at least one of a transmission performance of any one of the 2N channels of signals received by the receive end or a modulation order of a modulation mode of the any one of the 2N channels of signals, and
- whether the transmit end receives the first indication information or the second indication information is based on the modulation order of the modulation mode of the any one of the 2N channels of signals.

11. The method according to claim 10, wherein the second indication information is used to indicate the transmit end to use a second preset value as transmit power of the (2N−2) channels of signals, and the second preset value is greater than the first preset value.

12. The method according to claim 10, wherein the method further comprises:
- receiving, by the transmit end, third indication information from the receive end, wherein the third indication information is used to indicate the transmit end to send the any one of the 2N channels of signals by using a first modulation mode.

13. The method according to claim 10, wherein the two channels of signals comprise a horizontal polarization signal and a vertical polarization signal.

14. The method according to claim 10, wherein whether the transmit end receives the first indication information or the second indication information is based on the transmission performance of the any one of the 2N channels of signals received by the receive end and the modulation order of the modulation mode of the any one of the 2N channels of signals.

15. A microwave communication device, wherein the microwave communication device comprises:
- a processor and a memory, wherein
- the memory is configured to store a program; and when the processor executes the program, cause the microwave communication device to:
- receive 2N channels of signals through N first antennas, wherein the 2N channels of signals are respectively from N second antennas of a transmit end, each first antenna of the N first antennas receives the 2N channels of signals, each second antenna of the N second antennas sends two channels of signals, and N is an integer greater than or equal to 2, wherein
- when transmission performance of any one of the 2N channels of signals is less than a first threshold, respectively receive two channels of signals from two of the second antennas, wherein polarization directions of the two channels of signals are orthogonal; and
- when transmission performance of the two channels of signals is both greater than a second threshold, receive the 2N channels of signals through the N first antennas,
- wherein the transmission performance comprises one or more of the following: an equivalent antenna distance or a multipath notch depth, wherein the equivalent antenna distance is a ratio of an actual antenna distance to a Rayleigh antenna distance, the actual antenna distance is a physical distance between two of the N first antennas of the receive end, and the multipath notch depth is used to indicate a multipath notch degradation degree.

16. The microwave communication device according to claim 15, when the processor executes the program, cause the microwave communication device further to:
- send first indication information to the transmit end, wherein the first indication information is used to indicate the transmit end to use a first preset value as transmit power of (2N−2) channels of signals in the 2N channels of signals, and the (2N−2) channels of signals do not comprise the two channels of signals.

17. The microwave communication device according to claim 16, when the processor executes the program, cause the microwave communication device further to:
- send second indication information to the transmit end, wherein the second indication information is used to indicate the transmit end to use a second preset value as transmit power of the (2N−2) channels of signals, and the second preset value is greater than the first preset value.

18. The microwave communication device according to claim 17, when the processor executes the program, cause the microwave communication device further to:
- send third indication information to the transmit end, wherein the third indication information is used to indicate the transmit end to send the any one of the 2N channels of signals by using a first modulation mode.

19. The microwave communication device according to claim 15, when the processor executes the program, cause the microwave communication device further to:
- when a modulation order of a modulation mode of the any one of the 2N channels of signals is lower than a modulation order of a preset modulation mode, determine the transmission performance of the any one of the 2N channels of signals.

20. The microwave communication device according to claim 15, wherein the two channels of signals comprise a horizontal polarization signal and a vertical polarization signal.

* * * * *